*Drawing not in print*

U. S. PATENT OFFICE.

No. 102.   1861.   Whole No. 1,467.

Slate Roofing.

DANIEL RICKERBY, OF BOSTON, MASSACHUSETTS.

Letters Patent for a Design No. 102, dated August 13, 1861.

SPECIFICATION.

TO ALL WHOM IT MAY CONCERN:

Be it known, that I, DANIEL RICKERBY, of Boston, in the county of Suffolk and State of Massachusetts, have invented a new design for Slate Roofing, of which the following is a full, clear, and exact description, reference being had to the accompanying drawings making part of this specification, in which—

Fig. 1 is a perspective view of a portion of a roof, showing the design formed by the slates, when laid.

Figs. 2 and 3, the two forms in which the slates are cut.

The object of my present invention is, to produce a design for slate roofing for buildings, which shall be more ornamental and attractive in its appearance than the ordinary roofing formed of rectangular slates laid in straight lines, and my invention consists in the new design for slate roofing, represented in fig. 1, which is produced from slates cut in the forms shown in figs. 2 and 3, placed and secured in alternate layers on the roof.

That others skilled in the art may understand and use my invention, I will proceed to describe the manner in which I have carried out the same.

In the said drawings, A, fig. 2, represents one of the slates detached. It is cut at one end into the form shown, that is, with the contour of its end formed of four straight lines 1 2 3 4, with a point $a$ projecting from the middle of its width. Another slate B, fig. 3, is cut at one end, as shown, with three straight lines 5 6 7, which form the faces of an octagon, of which the width of the slate would be the diameter. These slates are nailed to the roof in the ordinary manner, in

*Rickerby's Design for Slate Roofing.* the position shown in fig. 1, commencing with a row of square slates, to form a straight edge at the eaves, next a row of the slates B, and over these a row of the slates A, the rows breaking joint with each other.

The portion of the slate B, which is laid to the weather, forms, when in position, an octagon, and the weather of the slate A forms a ten-sided figure, as shown in fig. 1.

*Claim.*

What I claim as my invention, and desire to secure by Letters Patent, is, the above design for slating, produced by the use of slates A and B, as specified.

DANL. RICKERBY.

Witnesses:
   THOS. R. ROACH,
   P. E. TESCHEMACHER.